(12) United States Patent
Niino et al.

(10) Patent No.: US 10,908,605 B2
(45) Date of Patent: Feb. 2, 2021

(54) DRIVING ASSIST DEVICE

(71) Applicant: DENSO CORPORATION, Kariya (JP)

(72) Inventors: Hiroaki Niino, Toyota (JP); Masayoshi Ooishi, Anjo (JP); Hiroshi Ishikawa, Nagoya (JP)

(73) Assignee: DENSO CORPORATION, Kariya (JP)

( * ) Notice: Subject to any disclaimer, the term of this patent is extended or adjusted under 35 U.S.C. 154(b) by 365 days.

(21) Appl. No.: 16/052,917

(22) Filed: Aug. 2, 2018

(65) Prior Publication Data

US 2018/0341260 A1 Nov. 29, 2018

Related U.S. Application Data

(62) Division of application No. 14/880,512, filed on Oct. 12, 2015, now Pat. No. 10,073,452.

(30) Foreign Application Priority Data

Oct. 17, 2014 (JP) .................................. 2014-212835

(51) Int. Cl.
*G05D 1/00* (2006.01)
*B60W 30/165* (2020.01)
(Continued)

(52) U.S. Cl.
CPC ........... *G05D 1/0061* (2013.01); *B60W 10/20* (2013.01); *B60W 30/16* (2013.01); *B60W 30/165* (2013.01); *B60W 50/14* (2013.01); *B60W 10/04* (2013.01); *B60W 10/18* (2013.01); *B60W 2540/00* (2013.01); *B60W 2540/10* (2013.01);
(Continued)

(58) Field of Classification Search
CPC .... G05D 1/0061; B60W 50/14; B60W 30/16; B60W 30/165; B60W 2540/10; B60W 2540/12; B60W 10/18; B60W 2720/10
See application file for complete search history.

(56) References Cited

U.S. PATENT DOCUMENTS 6,430,494 B1 8/2002 Inoue et al.
8,311,720 B2 11/2012 Pelosse
(Continued)

FOREIGN PATENT DOCUMENTS

DE           100 19 191 A1    10/2001
DE    10 2009 052 773 B3    4/2011
(Continued)

*Primary Examiner* — Donald J Wallace
(74) *Attorney, Agent, or Firm* — Maschoff Brennan

(57) ABSTRACT

In a driving assist system, a driving assist device as a control device acquires driving control information to be used for performing a driving control process in which an own vehicle follows a preceding vehicle running on the same lane of the own vehicle in front of the own vehicle. The driving assist device performs the driving control process of the own vehicle based on the acquired driving control information. The driving assist device detects an interruption of a preceding-vehicle following of the own vehicle. In the preceding-vehicle following, the own vehicle follows the preceding vehicle running on the same lane. The driving assist device decelerates a vehicle speed of the own vehicle by using a predetermined braking force when detecting the interruption of the preceding-vehicle following of the own vehicle during the preceding-vehicle following.

7 Claims, 4 Drawing Sheets

(51) Int. Cl.
*B60W 10/20* (2006.01)
*B60W 50/14* (2020.01)
*B60W 30/16* (2020.01)
B60W 10/04 (2006.01)
B60W 10/18 (2012.01)

(52) U.S. Cl.
CPC ... *B60W 2540/12* (2013.01); *B60W 2554/801* (2020.02); *B60W 2710/18* (2013.01); *B60W 2710/20* (2013.01); *B60W 2720/10* (2013.01); *G05D 2201/0213* (2013.01)

(56) References Cited

U.S. PATENT DOCUMENTS

| | | |
|---|---|---|
| 2004/0073367 A1 | 4/2004 | Altan |
| 2005/0182551 A1 | 8/2005 | Sugano |
| 2007/0276577 A1 | 11/2007 | Kuge |
| 2008/0059037 A1 | 3/2008 | Isaji |
| 2009/0005949 A1 | 1/2009 | Sugano |
| 2009/0128318 A1 | 5/2009 | Nagata et al. |
| 2011/0066350 A1* | 3/2011 | Sonoda ............ B60W 30/16 701/96 |
| 2013/0110368 A1 | 5/2013 | Zagorski |
| 2014/0288798 A1 | 9/2014 | Ando |
| 2014/0297151 A1 | 10/2014 | Nabeshima |
| 2016/0109881 A1 | 4/2016 | Niino et al. |

FOREIGN PATENT DOCUMENTS

| | | |
|---|---|---|
| DE | 10 2010 056 438 A1 | 6/2012 |
| JP | H11-048827 | 2/1999 |
| JP | 2000-280785 | 10/2000 |
| JP | 2005-231382 | 9/2005 |
| JP | 2008-001304 | 1/2008 |
| JP | 2009-208661 | 9/2009 |

* cited by examiner

DRIVING ASSIST DEVICE

CROSS-REFERENCE TO RELATED APPLICATION

This application is a divisional application of U.S. application Ser. No. 14/880,512, filed on Oct. 12, 2015, which claims priority from Japanese Patent Application No. 2014-212835, filed on Oct. 17, 2014, the contents of which are hereby incorporated by reference.

BACKGROUND OF THE INVENTION

1. Field of the Invention

The present invention relates to driving assist devices, to be mounted on vehicles, capable of performing a driving assist control.

2. Description of the Related Art

There has been known a technique providing a conventional driving assist device, to be mounted on various types of vehicles, capable of performing a driving assist control. For example, such a conventional driving assist device performs a preceding-vehicle following, or preceding-vehicle following control so that an own vehicle running at a predetermined vehicle speed follows a preceding vehicle on the same lane of a roadway while keeping a predetermined vehicle distance between the own vehicle and the preceding vehicle of not less than a predetermined vehicle distance. A patent document 1, Japanese patent laid open publication No. 2005-231382 provides a conventional driving assist device capable of performing a vehicle speed control of the own vehicle so that the own vehicle is running at a predetermined vehicle speed and maintains the predetermined vehicle speed even if the driving assist device cannot recognize the preceding vehicle under the preceding-vehicle following.

By the way, the preceding-vehicle following is interrupted in various cases. For example, the preceding-vehicle following is interrupted when the driver of the own vehicle increases or decelerates the speed of the own vehicle, or an abnormality occurs in a driving assist system equipped with the driving assist device.

However, the conventional driving assist device previously described does not change the driving state of the own vehicle running at the predetermined vehicle speed when the conventional driving assist device cannot detect the preceding vehicle due to occurrence of an abnormality in the driving assist system. That is, the conventional driving assist device considers the above driving state of the own vehicle to be equal to the case in which the own vehicle is running without abnormality. It is therefore difficult for the conventional driving assist device in the driving assist system to correctly inform the occurrence of interruption of the preceding-vehicle following to the driver of the own vehicle. For this reason, when the preceding vehicle decelerates, there is a possible danger in which the own vehicle running at the predetermined speed closely approaches the preceding vehicle.

SUMMARY

It is therefore desired to provide a driving assist device capable of providing to the driver of an own vehicle correct information regarding interruption of a preceding-vehicle following.

An exemplary embodiment provides a driving assist device having an information acquiring section, a driving control execution section, an interruption detection section and a deceleration section. The information acquiring section acquires driving control information to be used for a driving control process with which an own vehicle follows a preceding vehicle which is running in front of the own vehicle on a same lane of the own vehicle on a roadway. The driving control execution section performs the driving control process of the own vehicle on the basis of the acquired driving control information. The interruption detection section detects an interruption of a preceding-vehicle following of the own vehicle. The own vehicle is running to follow the preceding vehicle during the preceding-vehicle following as the driving control process. The deceleration section decelerates a vehicle speed of the own vehicle by using a predetermined braking force when the interruption detection section detects the interruption of the preceding-vehicle following of the own vehicle in the driving control process performed by the driving control execution section.

The structure of the driving assist device previously described makes it possible to provide correct information to the driver of the own vehicle so that the driver of the own vehicle correctly recognizes the occurrence of interruption of the preceding-vehicle following on the basis of the braking process (i.e. the deceleration process) of decelerating the speed of the own vehicle.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
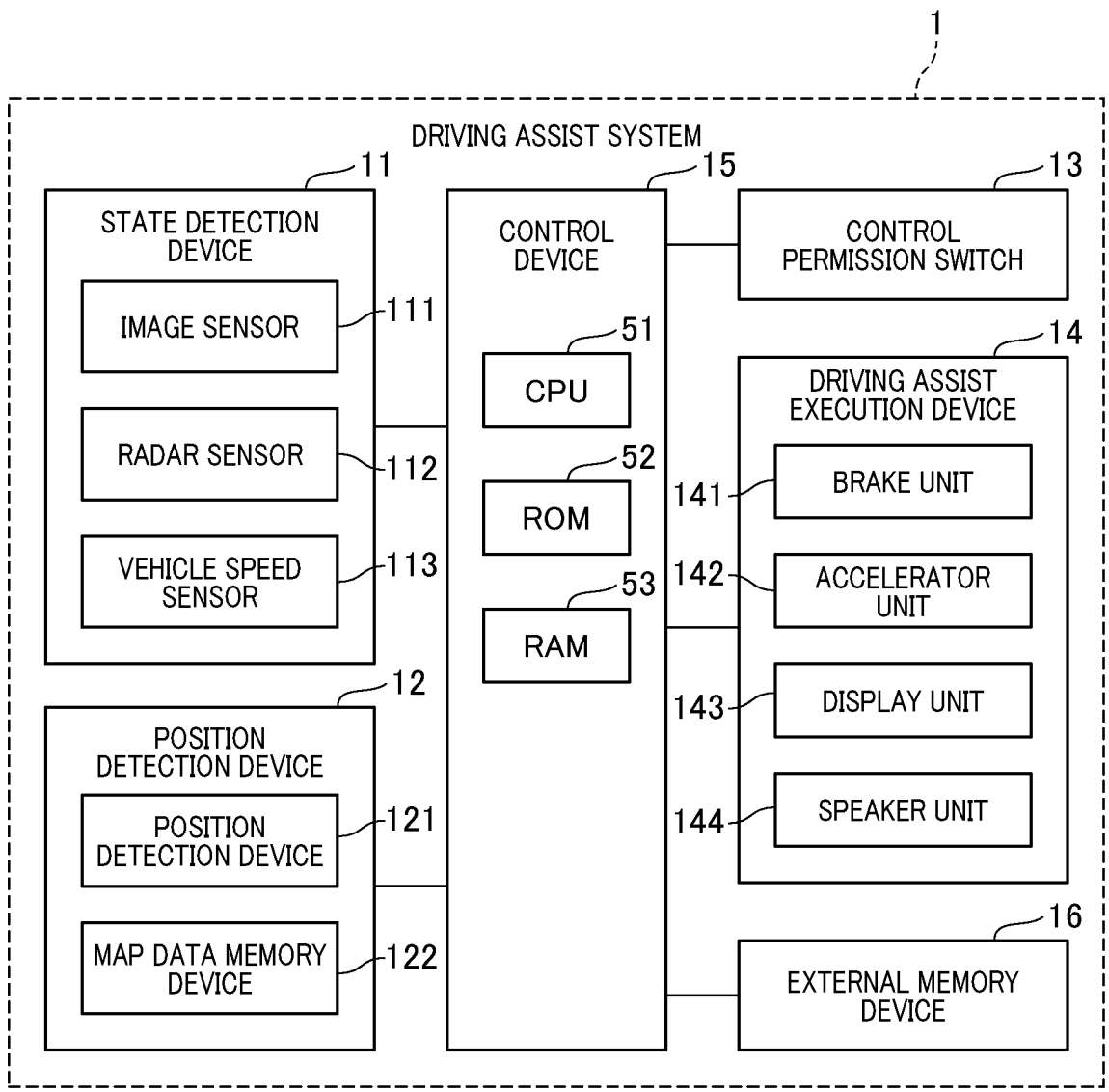
FIG. 1 is a block diagram showing a structure of a driving assist system equipped with a control device as a driving assist device according to an exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

Exemplary Embodiment

A description will be given of a driving assist system equipped with a driving assist device as a control device according to an exemplary embodiment with reference to FIG. 1 to FIG. 7.

[1. Structure]

FIG. 1 is a block diagram showing a structure of the driving assist system 1 equipped with the driving assist device 15 according to the exemplary embodiment and other components. That is, as shown in FIG. 1, the driving assist system 1 is mounted on an own vehicle. The driving assist system 1 has the control device 15 as the driving assist device, a state detection device 11, a position detection device 12, a control permission switch 13, a driving assist execution device 14, and an external memory device 16.

The state detection device 11 detects target objects present around the own vehicle and a state of the own vehicle on which the driving assist device 1 is mounted. For example, the state detection device 11 is equipped with an image sensor 111, a radar sensor 112 and a vehicle speed sensor 113.

The image sensor 111 captures image data from an area in front of the own vehicle, and processes the captured image data to detect a target object within a predetermined range in the image data. The image sensor 111 transmits the detection results to the control device 15.

The radar sensor 112 emits radio waves toward objects present in front of the own vehicle, and receives reflected radio waves. The radar sensor 112 detects at least a vehicle distance between the own vehicle and an object, and a relative speed between the own vehicle and the object. The radar sensor 112 transmits the detection results to the control device 15.

It is sufficient for the image sensor 111 and the radar sensor 112 to detect the presence of objects necessary to be processed by the vehicle control process performed by the control device 15 as the driving assist device. The exemplary embodiment performs the vehicle control process to detect at least one or more preceding vehicles. The preceding vehicle is a vehicle which is running on the same lane (or an own lane) in front of the own vehicle on a roadway. That is, the preceding vehicle is running on the same lane in front of the own vehicle.

The vehicle speed sensor 113 calculates a vehicle speed of the own vehicle and transmits the calculated vehicle speed to the control device 15. The position detection device 12 detects a current position of the own vehicle. For example, the position detection device 12 is equipped with a position detection device 121 and a map data memory device 122.

The position detection device 121 is equipped with a GPS (Global positioning system) receiver (not shown), a gyroscope, and a distance sensor, etc. The position detection device 121 detects an absolute position of the own vehicle and transmits the detection result to the control device 15.

The map data memory device 122 stores map data representing a map. The map data contain information indicating types of roads (high ways, national highway, general roads) on which vehicles can drive), information regarding curve roads and slope roads, information regarding lane change, etc.

The driver of the own vehicle sends to various devices through the control permission switch 13, for example, when the driver wants to perform the preceding-vehicle following. Under the preceding-vehicle following, it is possible for the own vehicle to drive at a determined vehicle speed, and follow the preceding vehicle on the same lane while controlling the own vehicle within a predetermined vehicle distance between the own vehicle and the preceding vehicle or the own vehicle of not less than the predetermined vehicle distance. In a concrete example, the control permission switch 13 is a steering switch capable of detecting an instruction of the driver of the own vehicle to perform the preceding-vehicle following when the control permission switch 13 has been turned on. Further, the control permission switch 13 detects an instruction of the driver of the own vehicle to release the own vehicle from the preceding-vehicle following when the control permission switch 13 has been turned off. Hereinafter, the preceding-vehicle following mode indicates a driving control state when the control permission switch 13 detects an instruction to perform the preceding-vehicle following.

The driving assist execution device 14 is equipped with a plurality of vehicle control devices capable of adjusting the operation of a body system, a power train system and a chassis system. The vehicle control devices adjust the behavior of the control targets on the basis of the driving state of the own vehicle. In addition, it is acceptable for the vehicle control devices to contain a brake device such as a brake unit 141, etc., a drive device for an accelerator unit 142, a display unit 143, a speaker unit 144, a steering device (not shown), and an internal combustion engine (not shown). Further, it is possible for each of devices forming the driving assist execution device 14 to perform known vehicle control such as a steering control, an engine control, a vehicle speed control, a collision avoidance control, a vehicle distance departing warning by controlling behavior of control targets on the basis of various instructions transmitted from the control device 15. Still further, it is possible for each of the vehicle control devices forming the driving assist execution device 14 to detect the state of the control targets and transmit the detection results to the control device 15 as the driving assist device.

The control device 15 is an electronic device equipped with a central processing device (CPU) 51, a read only memory (ROM) 52, a random access memory (RAM) 53, etc. The control device 15 performs various control programs stored in the memory devices such as the ROM 52, etc. to perform an integration control of the driving assist system 1. For example, the control device 15 generates instructions and output the generated instructions to the various devices and devices to perform the various vehicle control processes. The control device 15 further performs the driving assist process in parallel to the vehicle control processes.

The external memory device 16 is a rewritable memory device such as a flash memory to store various predetermined data items such as a predetermined vehicle distance, a predetermined vehicle speed, a first target deceleration to third target deceleration, a first waiting period and a second waiting period, etc. which will be explained later in detail.

[2. Processes]

A description will be given of the driving assist processes performed by the control device 15 as the driving assist device according to the exemplary embodiment with reference to FIG. 2.

Figure 2:
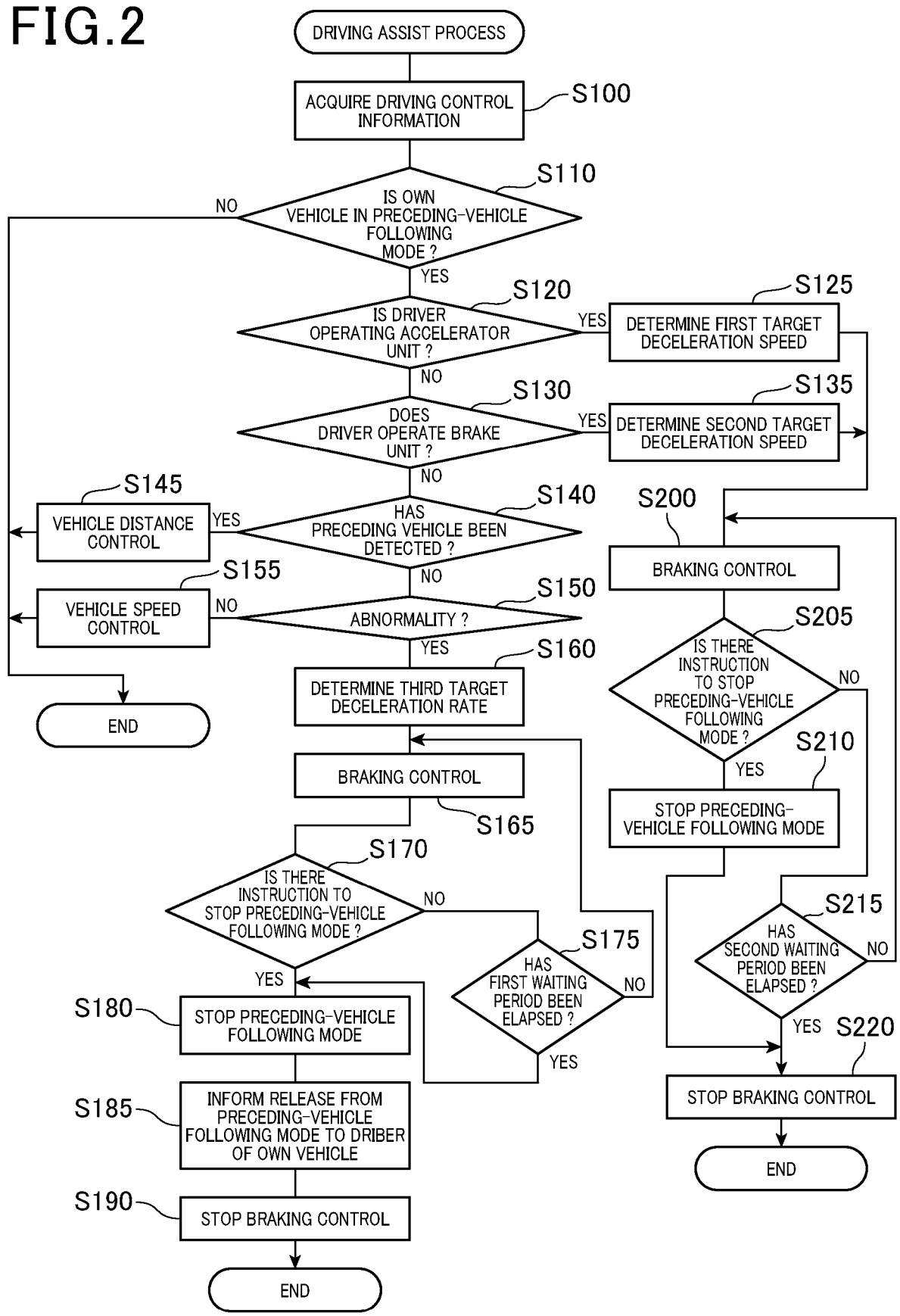
FIG. 2 is a flow chart showing a driving assist process performed by the driving assist device according to the exemplary embodiment of the present invention.

FIG. 2 is a flow chart showing the driving assist process performed by the driving assist device 15 according to the exemplary embodiment. The driving assist device 15 repeatedly performs the driving assist process shown in FIG. 2 when the own vehicle is running.

In step S100 shown in FIG. 2, the control device 15 acquires driving control information. Specifically, the control device 15 receives detection results transmitted from the state detection device 11, detection results transmitted from the position detection device 121, and information fetched from the map data memory device 122. The control device 15 uses the acquired information previously described as the driving control information which will be used for performing the preceding following to follow the preceding vehicle which is running in front of the own vehicle on the same lane of a roadway.

The detection results outputted from the state detection device 11 and the position detection device 121 contain the information which have been stored in the map data memory device 122. The operation flow goes to step S110.

In step S110, the control device 15 detects whether or not the own vehicle is in the preceding-vehicle following mode, i.e. the current driving mode is the preceding-vehicle following mode on the basis of the output of the control permission switch 13. When the detection result in step S110 indicates affirmation ("YES" in step S110), i.e. the current driving mode is the preceding-vehicle following mode, the operation flow goes to step S120.

On the other hand, when the detection result in step S110 indicates negation ("NO" in step S110), the control device 15 completes the driving assist process shown in FIG. 2.

In step S120, the control device 15 detects whether or not the driver of the won vehicle operates the accelerator unit 142. Specifically, the control device 15 detects the occurrence of the acceleration operation to the accelerator unit 142 on the basis of the devices forming the driving assist execution device 14. When the detection result in step S120 indicates affirmation ("YES" in step S120), i.e. indicates that no acceleration operation occurs, the operation flow goes to step S125. When the detection result in step S120 indicates negation ("NO" in step S120), i.e. indicates that the acceleration operation occurs, the operation flow goes to step S130.

When the detection result in step S120 indicates affirmation ("YES" in step S120), the operation flow goes to step S125. In step S125, the control device 15 sets a target deceleration rate to a first target deceleration rate. The target deceleration rate can be achieved by using a predetermined braking force. The operation flow goes to step S200.

On the other hand, when the detection result in step S120 indicates negation ("NO" in step S120), the control device 15 detects whether or not the driver operates the brake unit 141 in step S130. Specifically, the control device 15 detects whether or not the driver of the own vehicle operates the brake unit 141 on the basis of an output signal as a detection result transmitted from the device forming the driving assist execution device 14.

When the detection result in step S130 indicates affirmation ("YES" in step S130), i.e. the brake operation occurs, the operation flow goes to step S135. On the other hand, when the detection result in step S130 indicates negation ("NO" in step S130), i.e. no brake operation occurs, the operation flow goes to step S140.

When the detection result in step S130 indicates affirmation ("YES" in step S130), i.e. the brake operation occurs, the control device 15 sets the target deceleration rate to a second target deceleration rate in step S135. The target deceleration rate can be achieved by using a predetermined braking force. The operation flow goes to step S200.

On the other hand, when the detection result in step S130 indicates negation ("NO" in step S130), i.e. no brake operation occurs, the control device 15 detects whether or not a preceding vehicle is detected in step S140. Specifically, the control device 15 detects whether or not a preceding vehicle is detected on the basis of the output signal as the detection results transmitted from the image sensor 111 and the radar sensor 112 in step S140.

When the detection result in step S140 indicates affirmation ("YES" in step S140), i.e. a preceding vehicle is detected, the operation flow goes to step S145. On the other hand, when the detection result in step S140 indicates negation ("NO" in step S140), i.e. no preceding vehicle is detected, the operation flow goes to step S150.

When the detection result in step S140 indicates affirmation ("YES" in step S140), i.e. a preceding vehicle is detected, the control device 15 performs a vehicle distance control, i.e. the preceding-vehicle following in step S145. Specifically, the control device 15 generates and outputs an instruction signal to the driving assist execution device 14 to adjust a vehicle speed of the own vehicle so that the vehicle distance between the own vehicle and the preceding vehicle is not less than a predetermined vehicle distance. The control device 15 adjusts the vehicle speed of the own vehicle to be equal to the vehicle speed of the preceding vehicle as equal as possible. It is possible for the determined vehicle speed to be a predetermined value stored in the external memory device 16 or an instruction value determined by the driver of the own vehicle. The control device 15 completes the execution of the driving assist process shown in FIG. 2.

When the detection result in step S140 indicates negation ("NO" in step S140), the control device 15 detects in step S150 whether or not the detection result without detecting the preceding vehicle is caused due to abnormality. When receiving no driving control information, the control device 15 judges that the detection result in step S150 is generated due to abnormality for some reason. Specifically, the control device 15 determines that no driving control information is received when abnormality such as a disconnection or a short circuit occurs in the state detection device 11 or the position detection device 12 on the basis of the output signals transmitted from the state detection device 11 and the position detection device 12.

On the other hand, the control device 15 may judge that the detection result cannot detect the preceding vehicle due to a reason other than abnormality. For example, another situation may be that the own vehicle or the preceding vehicle had switched driving lane or the preceding vehicle is running on a curve road or road slope on the basis of the output signals as the detection results of the state detection device 11 and the position detection device 12.

The operation flow goes to step S160 when the detection result does not detect the preceding vehicle, which is caused due to abnormality. On the other hand, the operation flow goes to step S155 when the detection result does not detect the preceding vehicle due to a reason other than abnormality.

In step S155, the control device 15 performs the vehicle speed control. Specifically, the control device 15 generates and outputs an instruction signal to the driving assist execution device 14 in order to adjust the vehicle speed of the own vehicle so that the vehicle speed of the own vehicle becomes a predetermined vehicle speed. The control device 15 completes the driving assist process shown in FIG. 2. It is possible to use the predetermined vehicle speed which has been stored in the external memory device 16 or determined by the driver of the own vehicle.

On the other hand, when the detection result does not detect the presence of the preceding vehicle, due to abnormality ("YES" in step S150), the control device 15 sets the target deceleration rate to a third target deceleration rate in step S160. The operation flow goes to step S165.

In step S165, the control device 15 performs the braking process on the basis of the target deceleration rate. The target deceleration rate can be achieved by using a predetermined braking force. Specifically, the control device 15 generates and outputs an instruction signal to the driving assist execution device 14 so that the vehicle speed of the own vehicle decelerates by using the predetermined braking force on the basis of the target deceleration rate (the third deceleration rate) determined in step S160.

The control device 15 judges whether or not the driver of the own vehicle provides an instruction to stop the preceding-vehicle following mode in step S170. Specifically, the control device 15 detects whether or not the driver of the own vehicle turns on/off the control allowance switch 13 on the basis of the turned-on/off state transmitted from the control allowance switch 13. When the detection result in step S170 indicates affirmation ("YES" in step S170), i.e. indicates the detection of the driver's instruction to stop the preceding-vehicle following, the operation flow goes to step S180. On the other hand, when the detection result in step S170 indicates negation ("NO" in step S170), the operation flow goes to step S175.

In step S175, the control device 15 detects whether or not a predetermined first waiting period has elapsed. When the detection result in step S175 indicates negation ("NO" in step S175), i.e. indicates that the predetermined first waiting period is not elapsed, the operation flow returns to step S165. On the other hand, when the detection result in step S175 indicates negation ("YES" in step S175), i.e. indicates that the predetermined first waiting period has elapsed, the operation flow returns to goes to step S180.

In step S180, the control device 15 stops the preceding-vehicle following mode. Specifically, the control device 15 turns off the control permission switch 13 in order to stop performing the preceding-vehicle following. The operation flow goes to step S185. In step S185, the control device 15 provides information regarding the stop of the execution of the preceding-vehicle following mode to the driver of the own vehicle. Specifically, the control device 15 generates and outputs an instruction signal to the display unit 143 and the speaker unit 144 to inform that the preceding-vehicle following mode has been stopped to the driver of the own vehicle through the display unit 143 and the speaker unit 144. The operation flow goes to step S190.

In step S190, the control device 15 braking the own vehicle which has been performed on the basis of the target deceleration rate. Specifically, the control device 15 stops generating and transmitting an instruction to the driving assist execution device 14, where the instruction has been generated on the basis of the target deceleration rate (the third deceleration rate) and used by decreasing the speed of the own vehicle. The control device 15 completes the driving assist process shown in FIG. 2.

The operation flow goes to step S200 when the control device 15 has set the target deceleration rate of the own vehicle to the first target deceleration rate in step S125 or set the target deceleration rate of the own vehicle to the second target deceleration rate in step S135. In step S200, the control device 15 performs the braking process on the basis of the target deceleration rate. Specifically, the control device 15 generates and transmits an instruction to the driving assist execution device 14 in order for the driving assist execution device 14 to brake the own vehicle so as to decelerate the speed of the own vehicle on the basis of the target deceleration rate (the first target deceleration rate or the second target deceleration rate). The operation flow goes to step S205.

In step S205, the control device 15 detects whether or not the driver provides the instruction to stop the preceding-vehicle following mode. That is, the control device 15 detects the instruction to stop the preceding-vehicle following mode on the basis of the turned-on/off state of the control permission switch 13 operated by the driver of the own vehicle. When the detection result in step S205 indicates affirmation ("YES" in step S205), i.e. indicates that the instruction to stop the preceding-vehicle following mode is detected, the operation flow goes to step S210. On the other hand, when the detection result in step S205 indicates negation ("NO" in step S205), i.e. indicates that no instruction to stop the preceding-vehicle following mode is detected, the operation flow goes to step S215.

In step S210, the control device 15 stops the preceding-vehicle following mode. Specifically, the control device 15 turns off the control permission switch 13 in order to stop performing the preceding-vehicle following mode. The operation flow goes to step S220.

On the other hand, in step S215 when no instruction to stop the preceding-vehicle following mode is detected, the control device 15 judges whether or not a predetermined waiting period has elapsed. When the judgment result in step S215 indicates negation ("NO" in step S215), i.e. indicates the second waiting period is not yet elapsed, the operation flow returns to step S200. On the other hand, when the judgment result in step S215 indicates affirmation ("YES" in step S215), i.e. indicates the second waiting period has elapsed, the operation flow returns to step S220.

In step S220, the control device 15 stops the braking control, i.e. stops braking the own vehicle performed on the basis of the target deceleration rate. Specifically, the control device 15 halts the transmission of the instruction to the driving assist execution device 14, where the instruction has been used to decelerate the vehicle speed of the own vehicle. The control device 15 completes the driving assist process shown in FIG. 2.

A description will now be given of the target deceleration rate to be used in the driving assist process with reference to FIG. 3.

Figure 3:
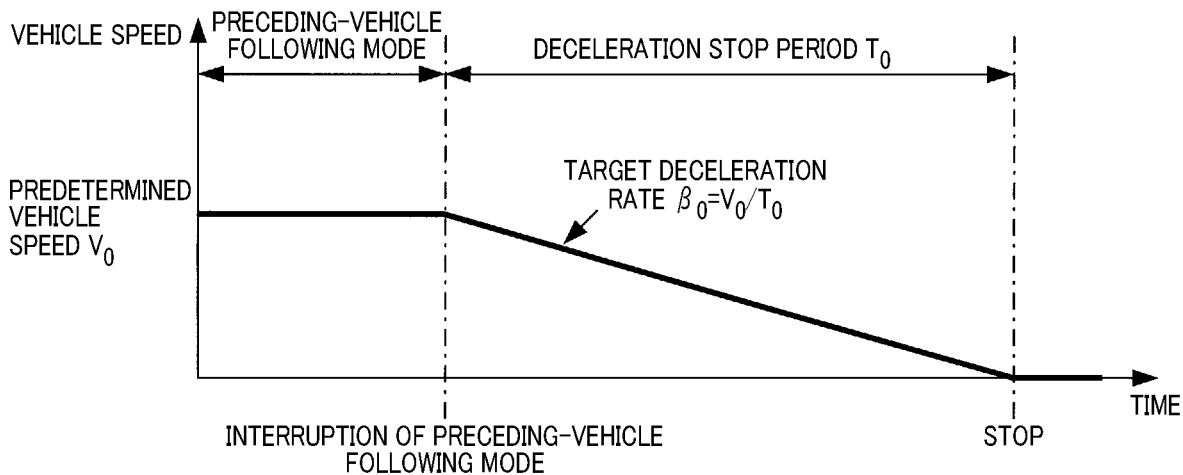
FIG. 3 is a view explaining a target deceleration rate used by the driving assist device according to the exemplary embodiment of the present invention.

FIG. 3 is a view explaining the target deceleration rate used by the driving assist device according to the exemplary embodiment.

The target deceleration rate $\beta_0$ is a deceleration rate with which the determined vehicle speed $V_0$ used during the preceding-vehicle following mode is decelerated to zero after the elapse of a predetermined period of time $T_0$ (called as a deceleration stop period). That is, the braking process performed on the basis of the target deceleration rate decelerates the vehicle speed of the own vehicle which is running at the predetermined vehicle speed $V_0$, and finally stops the own vehicle at a timing when the deceleration stop period $T_0$ is elapsed.

Figure 4:
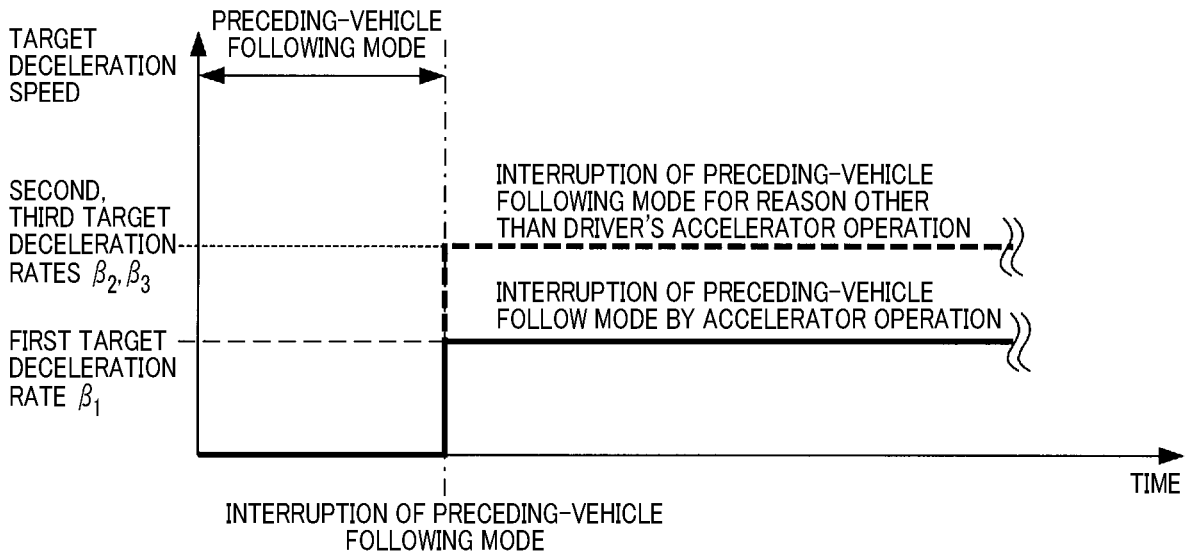
FIG. 4 is a view explaining a relationship between a first target deceleration, a second target deceleration and a third deceleration to be used by the driving assist device according to the exemplary embodiment of the present invention.

FIG. 4 is a view explaining a relationship between the first target deceleration rate $\beta_1$, the second target deceleration rate $\beta_2$ and the third target deceleration rate $\beta_3$. The first target deceleration rate $\beta_1$ which has been determined when the acceleration operation to the accelerator unit 142 is detected under the preceding-vehicle following mode. The second target deceleration rate $\beta_2$ and the third target deceleration rate $\beta_3$ are determined when the operation, other than the acceleration operation, is detected during the preceding-vehicle following mode. It is determined that the first target deceleration rate $\beta_1$ is smaller than the second target deceleration rate $\beta_2$ and the third target deceleration rate $\beta_3$. Although FIG. 4 shows the second target deceleration rate $\beta_2$ and the third target deceleration rate $\beta_3$ have the same value, it is possible for the second target deceleration rate $\beta_2$ and the third target deceleration rate $\beta_3$ to have a different value.

[3. Behavior or Actions]

A description will now be given of the behavior or actions of the driving assist system 1 according to the exemplary embodiment.

In a case in which no-preceding vehicle is detected due to abnormality ("YES" in step S150) in the preceding-vehicle following mode ("YES" in step S110), the control device 10 performs the braking process of the own vehicle (step S165) by using the predetermined braking force (step S160). The control device 15 continues the execution of the braking process until detecting the instruction of the driver of the own vehicle to stop the preceding-vehicle following mode ("YES" in step S170). However, when the control device 15 does not receive the instruction from the driver of the own vehicle even if the predetermined first waiting period has elapsed ("YES in step S175), the control device 15 stops the preceding-vehicle following mode. After stopping the preceding-vehicle following mode, the control device 15 provides to the driver of the own vehicle the information regarding the stop of the execution of the preceding-vehicle following mode (step S185).

Further, when the acceleration operation to the accelerator unit 142 occurs or the braking operation to the brake unit 141 occurs in the preceding-vehicle following mode ("YES" in step S110), the control device 15 performs the braking process (i.e. the deceleration process) of decelerating the speed of the own vehicle (step S200) on the basis of the predetermined braking force (step S125, step S135). The control device 15 continues the execution of the braking process until detecting the instruction of the driver of the own vehicle to stop the preceding-vehicle following mode ("YES" in step S205). However, when the control device 15 does not receive the instruction from the driver of the own vehicle even if the predetermined second waiting period has elapsed ("YES in step S215), the control device 15 stops the execution of the braking process on the basis of the target deceleration rate.

[4. Effects]

A description will now be given of the effects of the driving assist system 1 according to the exemplary embodiment having the structure previously described 4A. It is possible for the driving assist system 1 according to the exemplary embodiment to provide the information such as warning to the driver of the own vehicle so that the driver can correctly recognize the interruption of execution of the preceding-vehicle following by the deceleration control to the own vehicle.

In a case in which the preceding-vehicle following is interrupted, because there is a possible case in which the own vehicle rapidly approaches the preceding vehicle, it is preferable for the driving assist system 1 to provide a quick warning to the driver of the own vehicle regardless of the reason to cause the interruption of the preceding-vehicle following.

The driving assist system 1 according to the exemplary embodiment can start to perform the deceleration control in order to provide, to the driver of the own vehicle, the warning that the preceding-vehicle following has been interrupted. This makes it possible for the driver of the own vehicle to pay attention to the fact that the preceding-vehicle following has been interrupted.

4B. After the deceleration of the own vehicle is initiated, when the control device 15 detects the instruction from the driver of the own vehicle to release the own vehicle from the preceding-vehicle following on the basis of the switching state of the control permission switch 13, the control device 15 stops performing the driving control process in order for the own vehicle to follow the preceding vehicle. After the driver recognizes the interruption of the preceding-vehicle following, it is possible to release the preceding-vehicle following.

On the other hand, in a comparative case in which the preceding-vehicle following is released just when the control device detects that the driver of the own vehicle operates the accelerator unit or the brake unit, there is a possible case in which the preceding-vehicle following may be released even if the driver of the own vehicle accidentally touches the accelerator unit or the brake unit. That is, in the comparative case, the release of the own vehicle from the preceding-vehicle following occurs without recognition by the driver of the own vehicle that the preceding-vehicle following has been interrupted. Accordingly, the comparative case has a high risk phenomenon in which the own vehicle rapidly approaches the preceding vehicle when the preceding vehicle decelerates because the driver of the own vehicle does not recognize the interruption of the preceding-vehicle following.

4C. On the other hand, the driving assist system 1 according to the exemplary embodiment can detect the interruption of the preceding-vehicle following even if not receiving any driving assist information for some reason. Because the control device 15 in the driving assist system 1 initiates the execution of the deceleration control of the own vehicle when the preceding-vehicle following has been interrupted for some reason, it is possible for the control device 15 in the driving assist system 1 to provide to the driver of the own vehicle correct information such as warning regarding the occurrence of abnormality in the driving assist system 1 to perform the preceding-vehicle following.

4D. In a case in which the control device 15 performs the deceleration control when not detecting any preceding vehicle due to abnormality, i.e. the control device 15 does not receive any driving control information, when the driver of the own vehicle does not stop the preceding-vehicle following mode after the first waiting period has elapsed ("YES" in step S175), the control device 15 stops the preceding-vehicle following mode (step S180). Further, the control device 15 provides to the driver of the own vehicle information to stop the preceding-vehicle following mode. This makes it possible to forcedly stop the preceding-vehicle following mode when the control device 15 does not detect the preceding vehicle for some reason, for example abnormality. Still further, it is possible for the control device 15 to provide to the driver of the own vehicle information such as warning regarding the stop of the preceding-vehicle following mode.

4E. It is determined that the first target deceleration rate $\beta_1$ is smaller than the second target deceleration rate $\beta_2$ and the third target deceleration rate $\beta_3$. The first target deceleration rate $\beta_1$ is determined when the control device 15 detects that the driver of the own vehicle operates the acceleration unit 142 during the preceding-vehicle following mode. On the other hand, the second target deceleration rate $\beta_2$ and the third target deceleration rate $\beta_3$ are determined when a reason other than the driver's acceleration operation to the own vehicle, occurs. Because a deceleration rate has a small value, which is used when the interruption of the execution preceding-vehicle following mode occurs due to the detection of the acceleration operation, it is possible for the own vehicle to run on the basis of the driver's operation (such as the acceleration operation).

4F. When the control device 15 detecting the interruption of the execution of the preceding-vehicle following mode, the braking force to be used for decelerating the speed of the own vehicle is determined on the basis of the predetermined target deceleration rate so that the own vehicle, which is running at a predetermined vehicle speed, can be stopped within a predetermined period of time. It is preferable to determine a magnitude of the braking force so that the driver of the own vehicle correctly knows or recognizes the execution of the braking process of decelerating the speed of the own vehicle. This makes it possible to perform the braking process (i.e. the deceleration process) of decelerating the speed of the own vehicle by using an optimum braking force so that the driver of the own vehicle correctly knows the execution of the braking process (i.e. the deceleration process) of the own vehicle.

4G. The control device 15 finishes performing the braking control when not detecting the instruction to stop the preceding-vehicle following mode ("YES" in step S215) after the second waiting period has elapsed counted from a timing when the acceleration operation or the braking operation is detected. This makes it possible to continue the execution of the preceding-vehicle following mode on the basis of the driver's intend.

In the exemplary embodiment, the control device 15 corresponds to the driving assist device. The process in step S100 corresponds to an information acquiring section, the processes in step S145 and step S155 correspond to a driving control execution section, the processes in step S120, S130 and S150 correspond to an interruption detection section, and the processes in step S165 and S200 correspond to a deceleration section. Further, the processes in step S170 and S205 correspond to a release instruction detection section, and a processes in step S180 and S210 correspond to a driving control stop section.

Other Modifications

The concept of the present invention is not limited by the exemplary embodiment previously described. For example, it is possible for the driving assist device according to the present invention to have various modifications.

5A. In the structure of the driving assist device according to the exemplary embodiment previously described, the control device 15 performs the braking control on the basis of the target deceleration rate (steps S125, S135, and S160), which have been determined in advance, when the own vehicle drives at the predetermined vehicle speed and the preceding-vehicle following is interrupted (steps S165 and S200). However, the concept of the present invention is not limited by this. For example, in a case in which the control device 15 performs the braking control when the own vehicle is running while maintaining the predetermined vehicle distance and the preceding-vehicle following mode is interrupted, it is possible for the control device 15 to perform the braking control on the basis of the predetermined target vehicle distance, which is larger than the predetermined vehicle distance, instead of using the target deceleration rate.

Figure 5:
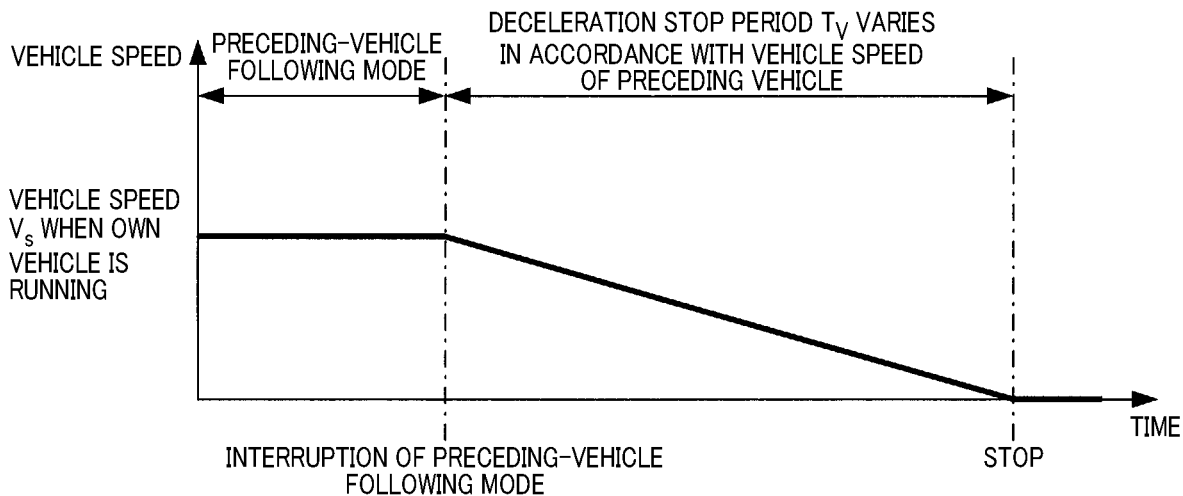
FIG. 5 is a view explaining a vehicle-speed change when the driving assist device performs a braking process on the basis of a predetermined target vehicle distance between the own vehicle and a preceding vehicle.

FIG. 5 is a view explaining a vehicle-speed change when the driving assist device performs the braking control on the basis of the predetermined target vehicle distance between the own vehicle and the preceding vehicle.

That is, as shown in FIG. 5, it is possible for the control device 15 to perform the braking process of the own vehicle so that the own vehicle decelerates and finally stops on the basis of the target vehicle distance, where the target vehicle distance is determined to gradually increase according to the elapse of time when the own vehicle is running at a vehicle speed Vs while maintaining the predetermined vehicle distance. In this case, a deceleration stop period Tv is determined in consideration to the vehicle speed of the preceding vehicle, where the deceleration stop period Tv indicates a period counted from a timing when the own vehicle is running at the vehicle speed Vs to a timing when the own vehicle stops completely.

Hereinafter, it is determined that the target vehicle distance is increased from the predetermined vehicle distance in accordance with the elapse of time.

Figure 6:
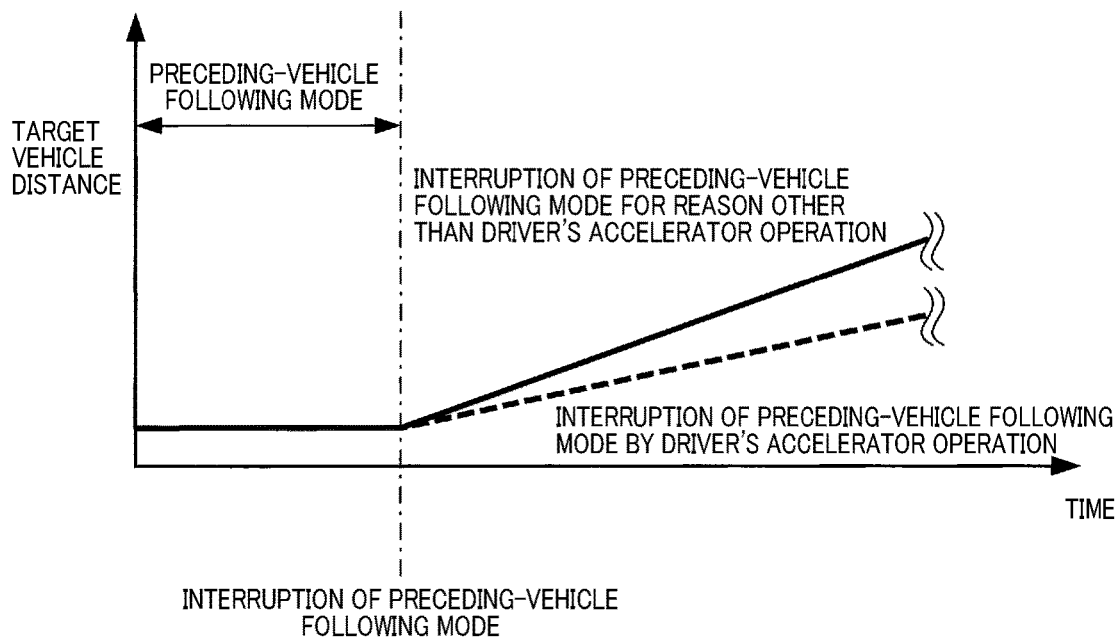
FIG. 6 is a view showing one example of the target vehicle distance.

FIG. 6 is a view showing one example of the target vehicle distance. As shown in FIG. 6, it is acceptable to increase the target vehicle distance by a predetermined ratio depending on the elapse of time.

When the preceding-vehicle following mode is interrupted by the driver's accelerator operation, it is acceptable to determine the target vehicle distance so that the target vehicle distance is smaller than the target vehicle distance determined when the preceding-vehicle following mode is interrupted caused by a reason other than the driver's accelerator operation. This makes it possible to perform the driving control process on the basis of the driver's intention (whether or not the accelerator operation occurs).

5B. It is acceptable for the first waiting period and the second waiting period to have a different time length. For example, it is acceptable to determine the first waiting period and the second waiting period so that each of the first waiting period and the second waiting period is shorter than the deceleration stop period corresponding to the target deceleration rate. In this case, the control device 15 stops performing the process of braking a speed of the own vehicle before the own vehicle stops completely. This control makes it possible for the driver of the own vehicle to correctly recognize the occurrence of interruption of the preceding-vehicle following by the execution of the braking process of decelerating the speed of the own vehicle, and smoothly perform the driving control process of the own vehicle without stop of the own vehicle.

Further, it is acceptable to determine the first waiting period and the second waiting period so that each of the first waiting period and the second waiting period is longer than the deceleration stop period corresponding to the target deceleration rate.

Figure 7:
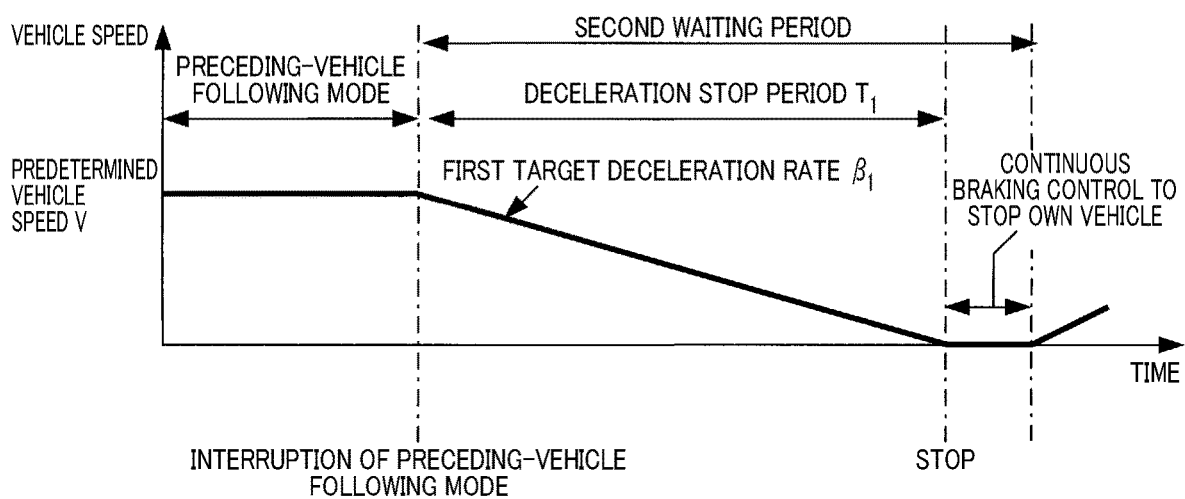
FIG. 7 is a view showing an example of a second waiting period to be used by the driving assist device according to the exemplary embodiment.

FIG. 7 is a view showing an example of the second waiting period to be used by the driving assist device 15 according to the exemplary embodiment.

As shown in FIG. 7, it is acceptable to determine the second waiting period which is longer than the deceleration stop period $T_1$ corresponding to the first target deceleration rate $\beta_1$. In this case, the own vehicle stops in a period after the deceleration stop period $T_1$ during the second waiting period. This control makes it possible for the driver of the own vehicle to surely recognize the occurrence of interruption of the preceding-vehicle following.

5C. It is possible to separate to a plurality of elements each of the components in the driving assist system according to the exemplary embodiment. It is also possible to integrate each of the components in the driving assist system according to the exemplary embodiment. While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

5D. It is possible to realize the functions of the control device 15 in the driving assist system 1 by using a driving assist method or programs to be stored in the ROM 52, the RAM 53, or another computer-readable memory storage medium.

What is claimed is:

1. A driving assist device comprising:
a computer system including a central processing unit, the computer system being configured to provide:
an information acquiring section capable of acquiring driving control information to be used for a driving control process with which an own vehicle follows a preceding vehicle which is running in front of the own vehicle on a same lane on a roadway;
a driving control execution section capable of performing the driving control process of the own vehicle on the basis of the acquired driving control information, the driving control execution section capable of instructing the own vehicle to follow the preceding vehicle at a predetermined vehicle speed;
an interruption detection section capable of detecting an occurrence of an interruption of a preceding-vehicle following of the own vehicle, the own vehicle following the preceding vehicle in the preceding-vehicle following as the driving control process; and
a deceleration section capable of decelerating a vehicle speed of the own vehicle at a first deceleration rate when the interruption detection section detects the occurrence of the interruption of the preceding-vehicle following of the own vehicle due to an operation of a driver of the own vehicle to one of an accelerator unit and a brake unit of the own vehicle, and the deceleration section being further capable of decelerating the vehicle speed of the own vehicle at a second deceleration rate when the interruption detection section detects the occurrence of the interruption of the preceding-vehicle following of the own vehicle due to abnormality of the driving assist device, in the driving control process performed by the driving control execution section, and the first deceleration rate being different from the second deceleration rate.

2. The driving assist device according to claim 1, the computer system being further configured to provide:
a release instruction detection section capable of detecting a release instruction provided by the driver of the own vehicle to interrupt the execution of the preceding-vehicle following of the own vehicle; and
a driving control stop section capable of stopping the driving control process performed by the driving control execution section, wherein the driving control stop section stops the driving control process performed by the driving control execution section when the release instruction detection section has detected the release instruction provided by the driver of the own vehicle after the deceleration section has started the deceleration of the vehicle speed of the own vehicle.

3. The driving assist device according to claim 2, wherein the interruption detection section detects, as the interruption of the preceding-vehicle following of the own vehicle, at least a state in which the information acquiring section acquires no driving control information due to occurrence of abnormality of the driving assist device.

4. The driving assist device according to claim 3, wherein the driving control stop section stops the driving control process performed by the driving control execution section after elapse of a predetermined period of time when the release instruction detection section detects no release instruction provided by the driver of the own vehicle after the vehicle speed of the own vehicle decelerates by the deceleration section.

5. The driving assist device according to claim 1, wherein the interruption detection section detects, as an interruption of the preceding-vehicle following when the driver of the own vehicle accelerates the vehicle speed of the own vehicle, and
the deceleration section decelerates the vehicle speed of the own vehicle at a third deceleration rate when the interruption detection section detects the interruption of the preceding-vehicle following of the own vehicle due to the acceleration performed by the driver of the own vehicle, and the third deceleration rate which is smaller than the first deceleration rate and the second deceleration rate.

6. The driving assist device according to claim 1, wherein the driving control instructs the own vehicle to follow the preceding vehicle at a predetermined vehicle speed.

7. The driving assist device according to claim 6, wherein the driving control instructs the own vehicle to follow the preceding vehicle so as to maintain not less than a predetermined vehicle distance between the own vehicle and the preceding vehicle.

* * * * *